United States Patent [19]

White et al.

[11] 3,875,220

[45] Apr. 1, 1975

[54] PROCESS FOR THE PREPARATION OF METHACRYLIC ACID FROM METHACROLEIN

[75] Inventors: James F. White, Shaker Heights; James R. Rege, Kent, both of Ohio

[73] Assignee: The Standard Oil Co., Cleveland, Ohio

[22] Filed: Oct. 11, 1973

[21] Appl. No.: 405,309

[52] U.S. Cl............. 260/530 N, 252/432, 252/456, 252/464, 252/467, 252/469, 252/470, 252/455 R

[51] Int. Cl....................... C07c 57/04, C07c 51/30

[58] Field of Search..................... 260/530 N, 533 N

[56] References Cited
UNITED STATES PATENTS 3,230,248  1/1966  Yanagita et al................. 260/530 N
3,435,069  3/1969  Bethell et al.................... 260/530 N

FOREIGN PATENTS OR APPLICATIONS 416,262  4/1966  Japan............................. 260/530 N Primary Examiner—Lorraine A. Weinberger
Assistant Examiner—Richard D. Kelly
Attorney, Agent, or Firm—Herbert D. Knudsen

[57] ABSTRACT

Catalysts containing phosphorus, vanadium and molybdenum have been found to be especially effective for the oxidation of methacrolein with molecular oxygen to obtain methacrylic acid. The catalysts may be optionally promoted with Bi, As, B, Ce, Cr, Ag, Fe, W, Pb, Mn, Tl, Te, Ni, Nb, B, Sn and/or Cu.

7 Claims, No Drawings

PROCESS FOR THE PREPARATION OF METHACRYLIC ACID FROM METHACROLEIN

BACKGROUND OF THE INVENTION

A number of catalysts are known to be effective for the oxidation of acrolein to acrylic acid. Although the disclosure also states that the catalysts are useful for oxidizing methacrolein to methacrylic acid, the yields obtained using the catalysts for the preparation of methacrylic acid are low. The present invention is the result of a search specifically directed toward the oxidation of methacrolein.

SUMMARY OF THE INVENTION

It has now been discovered in the process for the preparation of methacrylic acid from methacrolein by reacting methacrolein with molecular oxygen at a temperature of about 200° to about 500°C. in the presence of a catalyst and optionally in the presence of steam, the improvement comprising using as the catalyst a catalyst having the formula

wherein
- $a$ is a positive number less than about 6;
- $b$ is about 0.1 to about 12; and
- $x$ is the number of oxygens required by the valence states of the other elements present said catalyst optionally containing one or more elements selected from the group consisting of bismuth, arsenic, boron, cerium, chromium, silver, iron, tungsten, nickel, niobium, lead, manganese, thallium, tellurium, boron, tin or copper. These catalysts given high per pass conversions to methacrylic acid and are very stable under the required operating conditions.

The central aspect of the invention is the catalyst used in a known process of preparing methacrylic acid from methacrolein. The catalyst may be any of the catalysts designated by the formula given above. The catalysts can be prepared by a number of different techniques described in the art, such as coprecipitation of soluble salts and calcination of the resulting product.

Preferred catalysts contain molybdenum in a valence state below +6. These catalysts are prepared by reducing and stabilizing the hexavalent molybdenum in the catalyst preparation. About 2 to about 20% of the positive valence of hexavalent molybdenum is preferably reduced.

In the catalyst preparations, the various elements of the catalyst are combined, and the final product is calcined to obtain the catalyst. A number of methods of combining the elements of the catalyst and calcining the resultant product are known to those of skill in the art. In the broad concept of the invention, the particular method of preparing the catalyst is not critical.

There are, however, methods of preparing the catalysts that have been found to be preferred. One preferred preparation involves the refluxing of an aqueous mixture containing the appropriate amounts of phosphoric acid and molybdenum trioxide and adding vanadium trioxide. Another preferred preparation entails the reduction of hexavalent molybdenum with a reducing agent, and the use of this reduced molybdenum in the preparation of the catalyst. For example, molybdenum trioxide could be reacted with powdered molybdenum metal and the other elements to make up the desired catalysts and could be combined with the reduced molybdenum trioxide.

The calcination of the catalyst usually is accomplished by heating the dry catalytic components at a temperature of about 300° to about 700°C. The particular calcination for the most desirable results varies as different catalysts are prepared. The best calcination conditions for catalysts of the invention are shown in the Specific Embodiments.

The catalysts of the invention have preferred limitations on their composition. Preferred are catalysts wherein $a$ is about 0.5 to about 3, and catalysts wherein $b$ is about 1 to about 6. Also preferred are catalysts which contain one or more of bismuth, arsenic, cerium, chromium, tin, tungsten, nickel or niobium. The catalysts of the invention can be simply and conveniently prepared from inexpensive metal oxides that are easy to handle.

The reaction of methacrolein with molecular oxygen to produce methacrylic acid is known even though the results obtained using this reaction have not been highly desirable. The present invention uses substantially the same conditions; therefore, these conditions need not be presented in detail.

The reactants of the reaction of the invention are methacrolein and molecular oxygen. Molecular oxygen is normally supplied to the reaction in the form of air, but oxygen gas could also be employed. About 0.5 to about 4 moles of oxygen are normally added per mole of methacrolein.

Optionally, added to the reactants is steam or an inert diluent. Preferred reactions are conducted in the presence of substantial quantities of steam in the range of about 2 to about 20 moles of steam per mole of methacrolein.

The reaction temperature may vary as different catalysts are employed. Normally, temperatures of about 200° to about 500°C. are employed, with temperatures of less than about 400°C. being preferred.

The reaction is conveniently conducted in either a fixed-bed or fluid-bed reactor. The contact time may be as low as a fraction of a second or as high as 20 seconds or more. The reaction may be conducted at atmospheric, superatmospheric or subatmospheric pressure, with absolute pressures of about 0.5 to about 4 atmospheres being preferred.

When used in the reactor, the catalyst may be in a supported or unsupported form. Suitable support materials include silica, alumina, boron phosphate, zirconia, titania and the like.

Using the catalysts of the invention in the preparation of methacrylic acid from methacrolein, good yields are obtained in a convenient reaction with low amounts of by-products.

SPECIFIC EMBODIMENTS

EXAMPLES 1–6

Preparation of methacrylic acid using catalysts containing PVMo

Catalysts of the invention were prepared as follows:

EXAMPLE 1

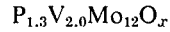

A slurry consisting of 64.7 g. of molybdenum trioxide, 5.76 g. of 85% phosphoric acid and 800 mls. of distilled water was refluxed for one hour. The color changed from white to greenish-yellow during this reflux. After reflux, 5.6 g. of vanadium trioxide was added and the slurry rapidly becomes dark blue. The slurry was boiled to dryness, dried in air at 110°–120°C. for 12 hours.

EXAMPLE 2

$P_{1.3}V_{3.2}Mo_{12}O_x$

This catalyst was prepared in the same manner as Example 1, except that 8.98 g. of vanadium trioxide was employed.

EXAMPLE 3

$P_{1.3}V_{4.0}Mo_{12}O_x$

This catalyst was prepared in the same manner as Example 1 using 86.4 g. molybdenum trioxide, 7.6 g. of 85% phosphoric acid and 14.9 g. of vanadium trioxide.

EXAMPLES 4–6

The catalysts were prepared in the same manner as shown above using the appropriate ratio of ingredients.

The catalysts prepared above were ground and screened to recover these particles of 20 to 30 mesh size. A portion of these catalyst particles were placed in a 20 c.c. fixed-bed reactor constructed of a 0.96 cm. inside diameter stainless steel tube heated in a split block furnace. The temperature inside of the reactor was monitored by a thermocouple.

The reactor was heated to reaction temperature under a flow of air and a feed of methacrolein/air/steam of 1/6.2/5.2 and was fed over the catalyst at an apparent contact time of four seconds. The weight of methacrolein fed/weight of catalyst/hour was 0.07. The reactor was run under the reaction conditions for 2 to 5 hours and then product was collected for 30 minutes and analyzed. The reaction conditions and results of the experiments are shown in Table I. The following definitions are used measuring the carbon atoms in the feed and the products.

% single pass yield = (product recovered × 100)/(methacrolein fed)

% conversion = (methacrolein reacted × 100)/(methacrolein fed)

% selectivity = (methacrylic acid recovered × 100)/(methacrolein reacted)

The remaining products produced were carbon oxides with only small amounts of acrylic acid and acrolein being produced.

EXAMPLES 7–14

Preparation and use of catalysts containing optional elements

Various catalysts containing optional elements of the present invention were prepared. These catalysts have the general formula $M_{0.8}P_{1.32}V_{2.0}Mo_{12}O_x$, wherein M is the optional element. The catalysts were prepared according to the procedure of Example 1 using 86.4 g. of molybdenum trioxide, 7.6 g. of 85% phosphoric acid and 7.5 g. of vanadium trioxide. The optional elements, M, were added following the one hour reflux and the addition of the vanadium trioxide. To prepare the catalysts, the following compounds and amounts were used:

| Element | Compound | Amount, g. |
| --- | --- | --- |
| Ce | ceric oxide | 6.88 |
| Sn | stannic oxide | 6.03 |
| Bi | bismuth trioxide | 9.32 |
| B | boric acid | 2.47 |
| Cr | chromic trioxide | 3.04 |
| Te | tellurium dioxide | 6.38 |
| Ni | nickel oxide | 2.99 |
| Nb | niobium oxide | 5.32 |

Following the addition of the optional element, the catalysts were boiled and dried according to Example 1.

The catalysts were ground, screened and tested as shown in the examples above. The results of using these catalysts in the oxidation of methacrolein are given in Table II.

TABLE I

Preparation of Methacrylic Acid from Methacrolein

| Example | Catalyst | Temp., °F. Bath | Temp., °F. Reactor | Single Pass Yield, % Methacrylic Acid | Single Pass Yield, % Acetic Acid | Conv., % | Sel., % |
| --- | --- | --- | --- | --- | --- | --- | --- |
| 1 | $P_{1.3}V_2Mo_{12}O_x$ | 343 | 356 | 57.0 | 5.4 | 80 | 72.5 |
| 2 | $P_{1.3}V_{3.2}Mo_{12}O_x$ | 343 | 361 | 48.2 | 6.0 | 77.4 | 62.3 |
| 3 | $P_{1.3}V_4Mo_{12}O_x$ | 371 | 388 | 45.8 | 6.7 | 78 | 59 |
| 4 | $P_{1.3}V_{1.6}Mo_{12}O_x$ | 343 | 356 | 55.0 | 5.5 | 75.7 | 72.7 |
| 5 | do. | 357 | 373 | 57.2 | 6.2 | 83.0 | 68.9 |
| 6 | $P_{1.3}V_{0.8}Mo_{12}O_x$ | 357 | 376 | 57.6 | 9.6 | 90.7 | 62.8 |

TABLE II

Conversion of Methacrolein to Methacrylic Acid Using $M_{0.8}P_{1.32}V_{2.0}Mo_{12}O_x$

| Example | Catalyst, M= | Temp., °C. Bath | Temp., °C. Bed | Single Pass Yield, % Methacrylic | Single Pass Yield, % Acetic | Conversion, % | Selectivity, % |
| --- | --- | --- | --- | --- | --- | --- | --- |
| 7 | Ce | 343 | 361 | 49.7 | 7.3 | 84.5 | 67.1 |
| 8 | Sn | 316 | 329 | 50.8 | 4.9 | 74 | 68.8 |
| 9 | Bi | 343 | 357 | 46.9 | 4.6 | 67 | 70 |
| 10 | B | 343 | 364 | 49.5 | 7.5 | 84.9 | 58.6 |
| 11 | Cr | 357 | 371 | 44.4 | 7.2 | 88.1 | 50.4 |
| 12 | Te | 357 | 373 | 48.3 | 7.7 | 78 | 62 |
| 13 | Ni | 329 | 342 | 50.8 | 5.0 | 73.9 | 68.7 |
| 14 | Nb | 343 | 364 | 51.0 | 7.7 | 88.4 | 57.7 |

EXAMPLE 15

Tungsten promoted catalyst

In the same manner as described by the examples above, a catalyst of the formula $W_3P_{1.5}V_3Mo_{12}O_x$ was prepared by dissolving 11.5 g. of 85% phosphoric acid, 141.2 g. of ammonium heptamolybdate, 53.9 g. of ammonium paratungstate in 1,500 ml. of distilled water. The mixture was brought to a boil and 23.4 g. of ammonium vanadate was added. The catalyst preparation was completed as described above.

The catalyst was ground, screened and tested according to the examples above. The single pass yield to methacrylic acid was 51.2%, the single pass yield to acetic acid was 3.4%, the conversion of the methacrolein was 82.8% and the selectivity to methacrylic acid was 62%.

We claim:

1. In the process for the preparation of methacrylic acid from methacrolein by reacting methacrolein with molecular oxygen at a temperature of about 200° to about 500°C. in the presence of a catalyst and optionally in the presence of steam, the improvement comprising using a catalyst consisting essentially of phosphorous, vanadium, molybdenum and oxygen, said catalyst having the formula $$P_a V_b Mo_{12} O_x$$

wherein $a$ is a positive number less than about 6;
$b$ is about 0.1 to about 12;
$x$ is the number of oxygens required by the valance states of the other elements present; and
wherein at least some of the molybdenum in the catalyst is maintained at a valence state below +6;

said catalyst optionally containing one or more elements selected from the group consisting of bismuth, arsenic, boron, cerium, chromium, silver, iron, tungsten, nickel, niobium, lead, manganese, thallium, tellurium, tin or copper.

2. The process of claim 1 wherein the molybdenum in the catalyst is hexavalent molybdenum which has been reduced to lose about 2 to about 20% of its positive valance.

3. The process of claim 1 wherein the catalyst is prepared by refluxing an aqueous mixture containing at least molybdenum trioxide.

4. The process of claim 1 wherein $a$ is about 0.5 to about 3.

5. The process of claim 1 wherein $b$ is about 1 to about 6.

6. The process of claim 1 wherein the catalyst contains one or more of bismuth, arsenic, cerium, chromium, tin, tungsten, nickel or niobium.

7. The process of claim 1 conducted in the presence of steam.

* * * * *

UNITED STATES PATENT OFFICE
CERTIFICATE OF CORRECTION

Patent No. 3,875,220  Dated April 1, 1975

Inventor(s) James F. White and James R. Rege

It is certified that error appears in the above-identified patent and that said Letters Patent are hereby corrected as shown below:

Specific Embodiments, Table 1: Title   In the title, "$^\circ$F" should be -- $^\circ$C --.

Signed and Sealed this

Ninth Day of November 1976

[SEAL]

Attest:

RUTH C. MASON  
Attesting Officer

C. MARSHALL DANN  
Commissioner of Patents and Trademarks